United States Patent
Brown, Jr. et al.

(10) Patent No.: US 7,539,761 B1
(45) Date of Patent: May 26, 2009

(54) SYSTEM AND METHOD FOR DETECTING AND DEFEATING IP ADDRESS SPOOFING IN ELECTRONIC MAIL MESSAGES

(75) Inventors: Bruce L. Brown, Jr., Goleta, CA (US); Samuel G. Silberman, Arlington, MA (US)

(73) Assignee: Openwave Systems, Inc., Redwood City, CA (US)

( * ) Notice: Subject to any disclaimer, the term of this patent is extended or adjusted under 35 U.S.C. 154(b) by 824 days.

(21) Appl. No.: 10/742,329

(22) Filed: Dec. 19, 2003

(51) Int. Cl.
*G06F 15/16* (2006.01)
(52) U.S. Cl. ...................................... 709/227
(58) Field of Classification Search .......... 709/225–227
See application file for complete search history.

(56) References Cited

U.S. PATENT DOCUMENTS

| | | | | |
|---|---|---|---|---|
| 5,828,468 A | * | 10/1998 | Lee et al. | 358/434 |
| 6,052,709 A | * | 4/2000 | Paul | 709/202 |
| 6,321,267 B1 | * | 11/2001 | Donaldson | 709/229 |
| 6,654,787 B1 | * | 11/2003 | Aronson et al. | 709/206 |
| 7,249,175 B1 | * | 7/2007 | Donaldson | 709/225 |
| 2002/0114334 A1 | * | 8/2002 | Yang | 370/395.1 |
| 2004/0177120 A1 | * | 9/2004 | Kirsch | 709/206 |
| 2005/0050150 A1 | * | 3/2005 | Dinkin | 709/207 |

OTHER PUBLICATIONS

Harris, Evan, "The Next Step in the Spam Control War: Greylisting," Aug. 21, 2003, <http://projects.puremagic.com/greylisting/whitepaper.html>, pp. 1-16.*
Donnerhacke, Lutz, "Teergrubing FAQ," Feb. 10, 2003, <http://web.archive.org/web/20030210125542/http://www.iks-jena.de/mitarb/lutz/usenet/teergrube.en.html>, pp. 1-3.*
Slettnes, Tor, "SMTP Transaction Delays," Aug. 10, 2004, <http://web.archive.org/web/20040810023504/http://slett.net/spam-filtering-for-mx/techniques.html>, pp. 1-2.*
Klensin, J.; "RFC 2821—Simple Mail Transfer Protocol", obtained from http://www.faqs.org/rfcs/rfc2821.html, Sep. 18, 2003, pp. 1-66.

* cited by examiner

*Primary Examiner*—Jeffrey Pwu
*Assistant Examiner*—Farhad Ali
(74) *Attorney, Agent, or Firm*—Townsend and Townsend and Crew LLP (57) ABSTRACT

A method and system for detecting spoofed network connections comprising receiving a connection from a client, delaying sending a greeting message for a delay period, monitoring the connection during the delay period, and if a command is received from the client before the greeting is sent, then identifying the connection as a possible spoofed connection.

16 Claims, 7 Drawing Sheets

SYSTEM AND METHOD FOR DETECTING AND DEFEATING IP ADDRESS SPOOFING IN ELECTRONIC MAIL MESSAGES

TECHNICAL FIELD

The present invention is directed generally to detecting email messages that are sent by spammers and, more particularly, to detecting messages that are sent by Mail Transfer Agents (MTAs) and Mail User Agents (MUAs) that spoof the sender's network address.

BACKGROUND

Internet or electronic mail "spam," such as unsolicited and unwanted advertisements sent to a very large number of recipients, is a well-known problem that effects virtually all Internet email accounts. Spammers send their messages to millions of recipient email address for a very low per-message cost. Spammers need a very low response rate from the recipients in order to recover their costs. As a result, spam email has become a widespread problem.

In order to block spam messages, some email systems keep address lists of known spammers and block any messages that include a sender IP address that is on the known spammer list. Many spammers overcome and avoid this anti-spam technique by spoofing the sender's IP address that is used in spam emails. This effectively hides the true sender's IP address and circumvents existing anti-spam methods. The recipient's mail server cannot keep an up-to-date list of spoofed sender IP address. Moreover, many valid non-spammer IP addresses are used by the spammers in their messages. Spam messages typically include an Internet link or some other contact information so that the spammer does not desire or expect return email messages from the recipients. Therefore, the use of an incorrect or spoofed IP address does not adversely affect the spammer in most cases.

SUMMARY

The present invention is directed to a system and method that detects spam messages using existing email protocols. For example, the Simple Mail Transfer Protocol (SMTP), which is defined in RFC 2821, the disclosure of which is hereby incorporated by reference herein in its entirety, specifies that the SMTP server must send a greeting to the SMTP client when a connection is established. The SMTP client cannot send any data before the SMTP server sends the greeting. According to the SMTP protocol, the communication between the sender and receiver is an alternating dialogue that is controlled by the sender. The sender issues a command and the receiver responds with a reply. Unless other arrangements are negotiated through service extensions, the sender must wait for this response before sending further commands.

When an IP address is spoofed, the TCP connection to the server is forged and replaced with the identity of a different IP address. The spoofer simulates the TCP client side of a TCP connection in order to spoof the IP address of that connection. The server side is unaware of this, so it sends it responses to a TCP/IP socket that does not exist or that is not associated with the spoofing server. In effect, the client side of the spoofed connection cannot read any responses from the SMTP server.

In the present invention, a mail server delays the sending of the greeting for a period of time. During this period, if the connection receives any incoming data on the connection then the mail server knows that the client is not adhering to the SMTP protocol and is most likely a spammer. As a result, the spammer is not able to send the spam message or is forced to hold the connection open for a significantly longer period of time than expected. This has the effect of raising the cost of spamming. When the spammer is detected the mail server may continue to accept the connection and then drop it at the completion of the mail transfer, so that the spammer is unaware of how it was detected.

The normal SMTP sequence is:

Client Connects to Server;

Server responds with Greeting;

Client waits for greeting and then sends HELO or EHLO command.

This sequence remains unchanged. Instead, the timing is changed. Rather than immediately sending the greeting from the server a delay is introduced. During that delay the connection is polled for data. If any data is delivered from the client it is a protocol violation and the connection is considered to be from a spoofer. Because the client did not wait for the greeting, it is assumed the client was unable to read the greeting and hence is considered to be a spoofer. Similarly, if the client does not wait for a reply to the previous SMTP command, it is assumed that the client was unable to read the reply and is a spoofer.

The foregoing has outlined rather broadly the features and technical advantages of the present invention in order that the detailed description of the invention that follows may be better understood. Additional features and advantages that form the subject matter of the claims of the invention will be described hereinafter. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION

Figure 1:
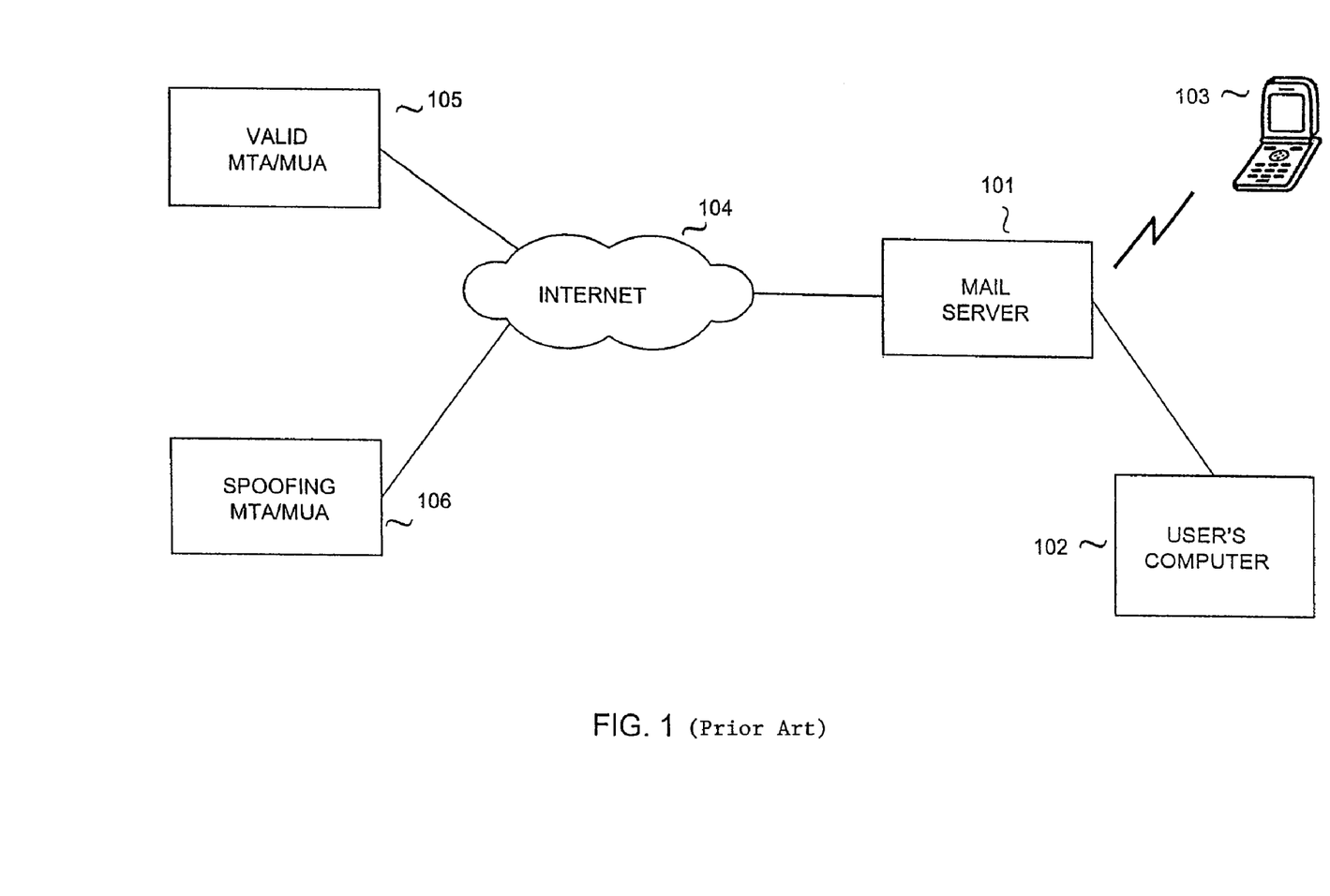
FIG. 1 is a high-level block diagram of an Internet-based email system.

FIG. 1 is a high-level block diagram of an Internet-based email system. Mail server 101 provides email service for a plurality of users. Mail server 101 may store email and may provide an application to send and receive email messages to user accounts on other servers. Users may access their email accounts on server 101, for example, via a wireline connection to computer 102, such as a personal computer (PC) or workstation, or via a wireless connection to device 103, such as a mobile telephone, wireless personal digital assistant (PDA), or the like. Mail server 101 is connected to Internet 104 and to other mail servers or clients, such as 105 and 106.

Server 101 and Server/Clients 105 and 106 exchange email messages using Simple Mail Transfer Protocol (SMTP), which is defined in RFC 2821, the disclosure of which is hereby incorporated by reference herein in its entirety. SMTP servers and clients provide a mail transport service and are referred to as Mail Transfer Agents (MTAs) and Mail User Agents (MUAs). Server 101 in FIG. 1 is an MTA. Server/Clients 105 and 106 may be an MUA or MTA. SMTP provides the capability to transport mail between applications on the same network or between applications on separate networks using, for example, a gateway or relay. To effect a mail transfer to an SMTP server, an SMTP client establishes a two-way transmission channel with the SMTP server. When a valid client, such as MTA/MUA 105 sends email messages to mail server 101, valid client 105 establishes a channel with mail server 101.

Figure 2:
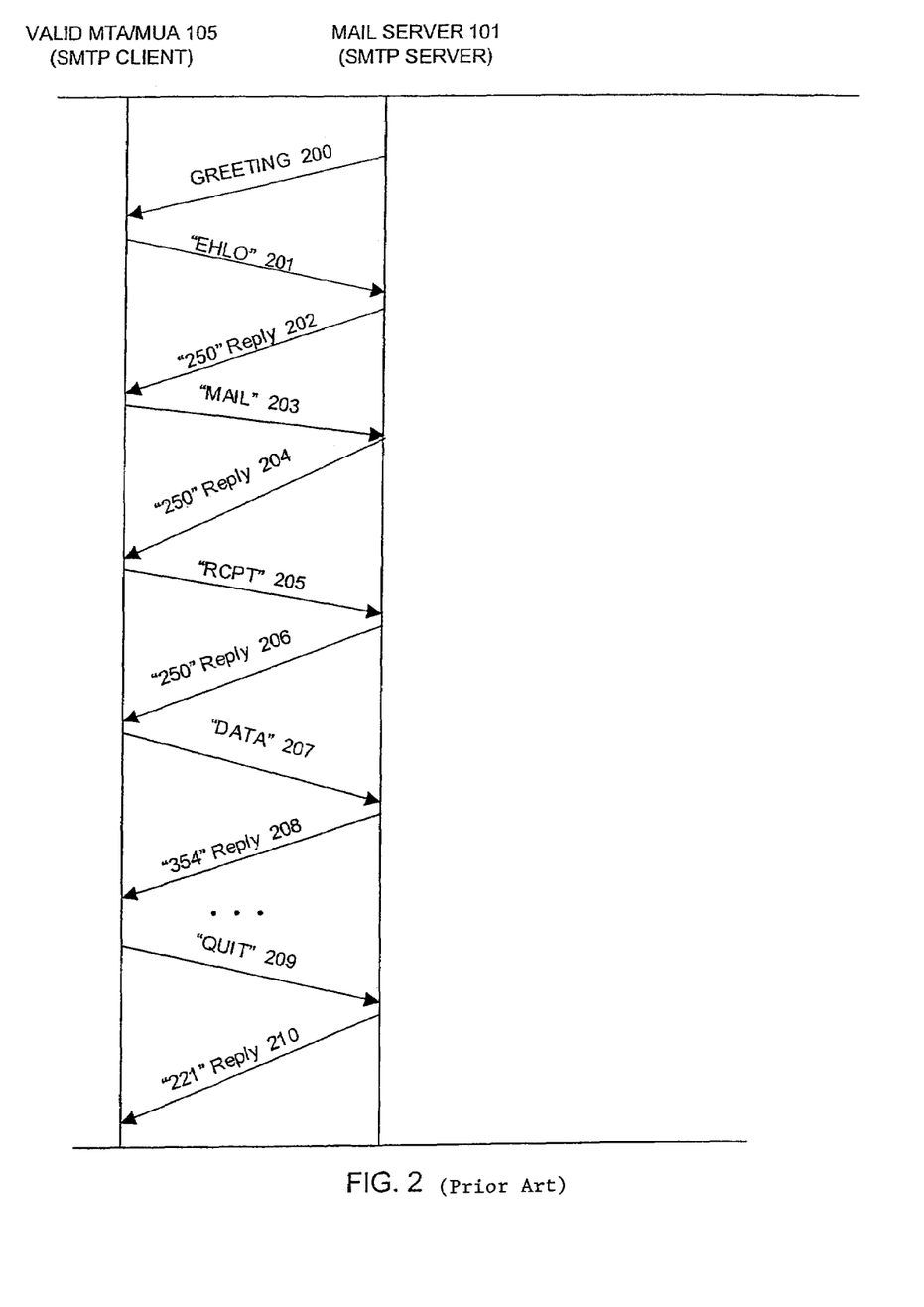
FIG. 2 is a bounce diagram illustrating the commands and replies that are exchanged during a typical valid mail transfer session.

FIG. 2 is a bounce diagram illustrating the commands and replies that are exchanged during a mail transfer session between valid MTA/MUA 105 and mail server 101. Valid MTA/MUA 105 acts as an SMTP client and mail server 101 acts as an SMTP server. To initiate the session, the SMTP client waits for Greeting command 200 from the mail server 101, then the SMTP client sends EHLO command 201. The EHLO command indicates to the server that the client is able to process service extensions. Older systems that do not support service extensions may initiate the session with the HELO command. In response to the EHLO command, mail server 101 sends "250" reply message 202, which indicates that the action was accepted and completed. MTA/MUA 105 then sends "MAIL" command 203 to initiate a mail transaction. The MAIL command contains a reverse-path parameter that identifies the sender's mailbox. Mail server 101 responds to the MAIL command with "250" reply message 204.

Valid MTA/MUA 105 follows the MAIL command with RCPT (recipient) command 205, which identifies the recipient of the mail data in a forward-path parameter. Multiple recipients may be identified using multiple RCPT commands. Again, mail server 101 responds to the RCPT command with "250" reply message 206. Valid MTA/MUA 105 then sends mail data using DATA command 207. Mail server 101 appends the mail data to a mail data buffer and replies to the DATA command with "354" message 208. Once the mail data has been sent, valid MTA/MUA 105 may close the transmission channel by sending QUIT command 209 to which mail server 101 sends "221" command 210 to indicate that the service is closing the transmission channel.

The SMTP protocol defined in RFC 2821 requires that the communication between the sender and receiver take the form of an alternating dialogue as illustrated in FIG. 2, wherein the sender waits for an initial greeting and then issues a command and the receiver responds with a reply. The sender controls the exchange and must wait for the receiver's response before sending further commands. Therefore, valid MTA/MUA 105 must wait for mail server 101 to send the Greeting or to reply to valid MTA/MUA 105's last command before sending a new command. A spoofing MTA/MUA attempts to imitate the actions of a valid SMTP client, such as valid MTA/MUA 105, when sending mail. However, the spoofing MTA/MUA does not provide its own correct IP address, so it cannot receive the initial greeting or reply messages.

Figure 3:
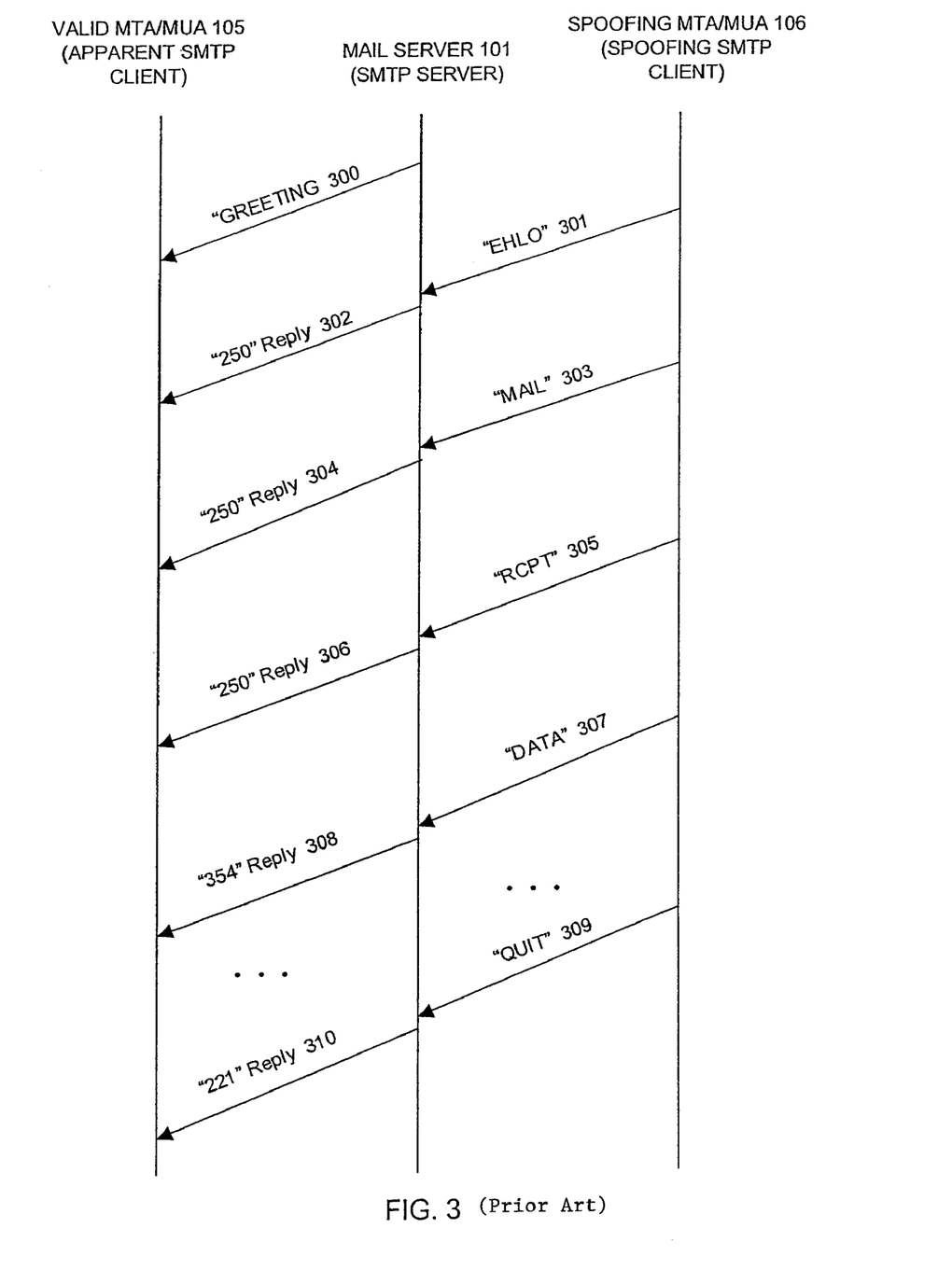
FIG. 3 is a bounce diagram illustrating the messages exchanged during an exemplary spoofed mail transaction.

FIG. 3 is a bounce diagram illustrating the messages exchanged during a spoofed mail transaction. When a spoofing server, such as MTA/MUA 106, for example, sends spam messages to mail server 101, spoofing MTA/MUA 106 simulates the client side of a TCP connection. Spoofing MTA/MUA 106 identifies the address of a spoofed server, such as a valid MTA/MUA 105, when it establishes the mail transaction. Accordingly, all responses sent by mail server 101 are directed to valid MTA/MUA 105, the apparent SMTP client.

Spoofing MTA/MUA 106 acts as a SMTP client and initiates a session with EHLO command 301. In order to comply with the alternating dialogue requirement of RFC 2821, spoofing MTA/MUA 106 must not send EHLO command 301 until greeting 300 has been received. However, spoofing MTA/MUA 106 never receives greeting 300 and does not know if greeting 300 has been sent. Accordingly, spoofing MTA/MUA 106 must estimate when greeting 300 is sent and must delay sending its next command (i.e. EHLO command 301) so that EHLO command 301 does not arrive at mail server 101 before greeting 300 is sent. Mail server 101 responds to EHLO command 301 by sending "250" message 302 to valid MTA/MUA 105.

The remaining commands and replies in FIG. 3 must also comply with the alternating dialogue requirement of RFC 2821. Spoofing MTA/MUA 106 should delay sending RCPT command 305, DATA command 307 and QUIT command 309 until reply messages 304, 306 and 308, respectively, are sent. All of the replies, including the final "221" reply 310 are sent to the apparent SMTP client at valid MTA/MUA 105, so spoofing server never knows when the actual replies are transmitted by mail server 101.

If mail server 101 detects a new command from the SMTP client before a greeting has been sent or a reply has been sent to the previous command, then the session may be identified as possibly coming from a spoofing server. Current MTAs typically generate greetings almost immediately upon receiving the connection from the SMTP clients. Similarly, replies to SMTP commands almost immediately upon receiving the commands from SMTP clients. Current MTAs do not monitor the command/response timing. Therefore, existing MTAs are unable to detect spammers by monitoring compliance with the timing requirements of the RFC 2821 protocol.

Figure 4:
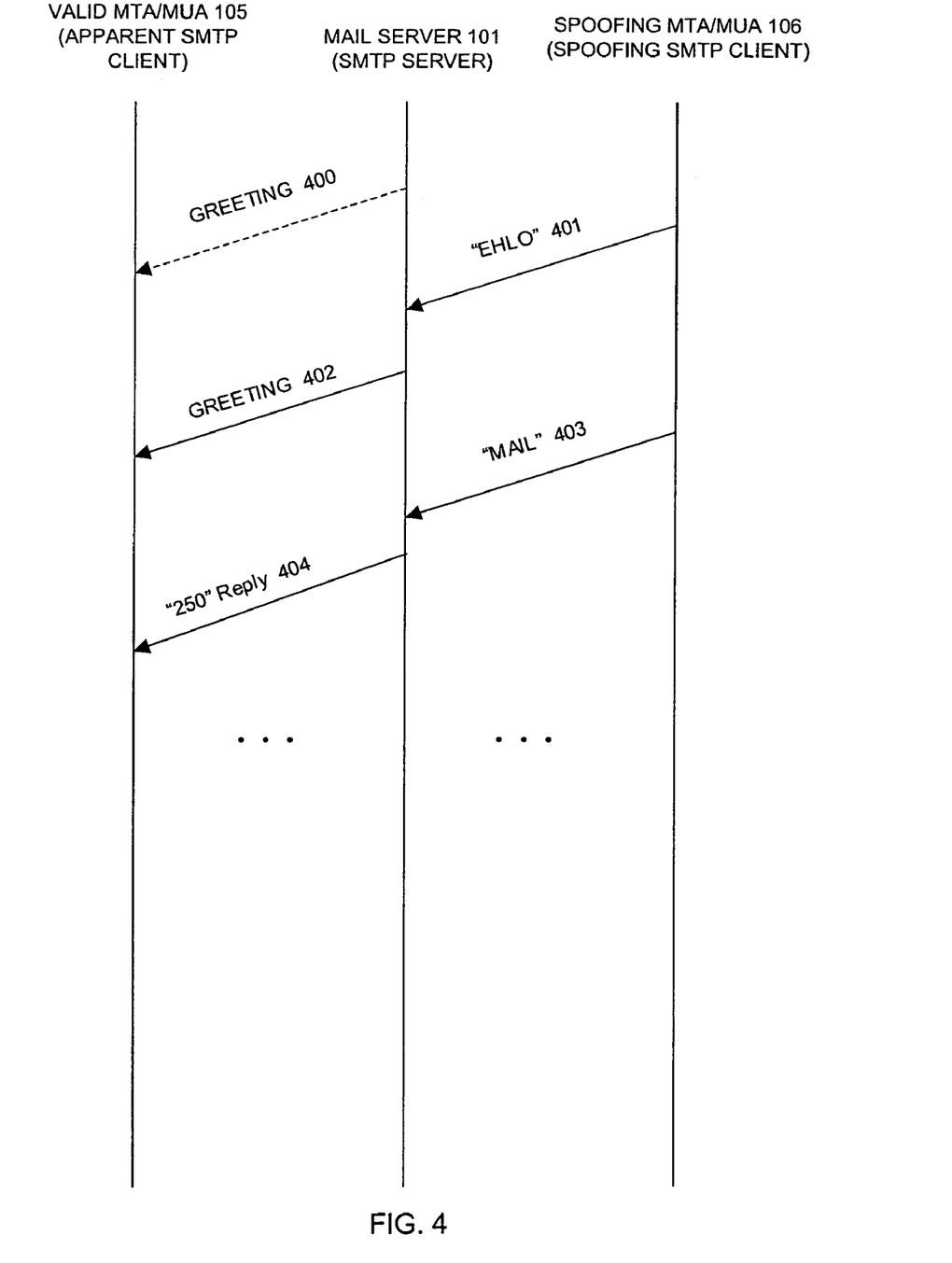
FIG. 4 is a bounce diagram illustrating the messages exchanged during a spoofed mail transaction according to an embodiment of the invention.

FIG. 4 illustrates a portion of a bounce diagram illustrating a method for detecting spammers according to the present invention. When a TCP connection is established, mail server 101 would normally send the required greeting as Greeting 400. However, according to embodiments of the present invention, the timing for sending the greeting command is slightly delayed so that the actual greeting message is not sent until Greeting 402. Spoofing MTA/MUA 106 is operating under an expected message-exchange timeline (i.e. under the expectation that Greeting 400 would be immediately sent) and sends EHLO command 401 to mail server 101 before actual Greeting 402 has been sent. As illustrated in the example of FIG. 4, spoofing MTA/MUA 106 does not know when mail server 101 sends its greeting command and may send EHLO command 401 so that message 401 arrives at mail server 101 before Greeting 400 was sent. In this situation, mail server 101 may identify the session as being initiated by a spammer and may treat the email data as a spam message.

Such spam messages may be treated in any number of ways, such as appending a warning in the message subject line before passing the spam message to the user, deleting the spam message, storing the spam message in a directory that is separate from the user's inbox, or other techniques.

In order to discourage spammers from spoofing the sender's IP address, some burden must be placed on the spammer that adds cost to the spammer's email operation or reduces the number of spam messages that can be sent by the spammer. One way of adding cost and reducing the number spam messages is to force the spammer to take a longer than usual time to send each spam message. Using the present invention, spammers must add some additional delay before sending each of the SMTP commands in order to avoid detection. If, for example, greeting 400 is delayed 5 seconds, then EHLO message 401 from the spoofer must also be delayed by an additional 5 seconds. Similar delays can be introduced for each response. For a normal email session involving a valid server, a single 5-second delay would have a negligible effect on the overall message transfer. However, for a spoofing spammer that is sending one million email messages, an additional 5 second delay for each email message would require an extra 5 million seconds (which is the equivalent of more than 57 days) to send all one million messages. Such a delay would likely be unacceptable to most spammers and may force the spammers to cease spoofing the sender's IP address in order to avoid the excess transmission time.

In an alternative embodiment, mail server 101 may delay any one or more of the responses to the SMTP messages required under RFC 2821. For example, instead of or in addition to delaying the sending of the greeting, the SMTP server may delay the response to any other command from the SMTP client, such as the EHLO, MAIL, RCPT, or DATA commands. If a subsequent command is received from the SMTP client before the SMTP server actually sends a reply, the SMTP server may identify the message as a possible spam email from a spoofing server.

Figure 5:
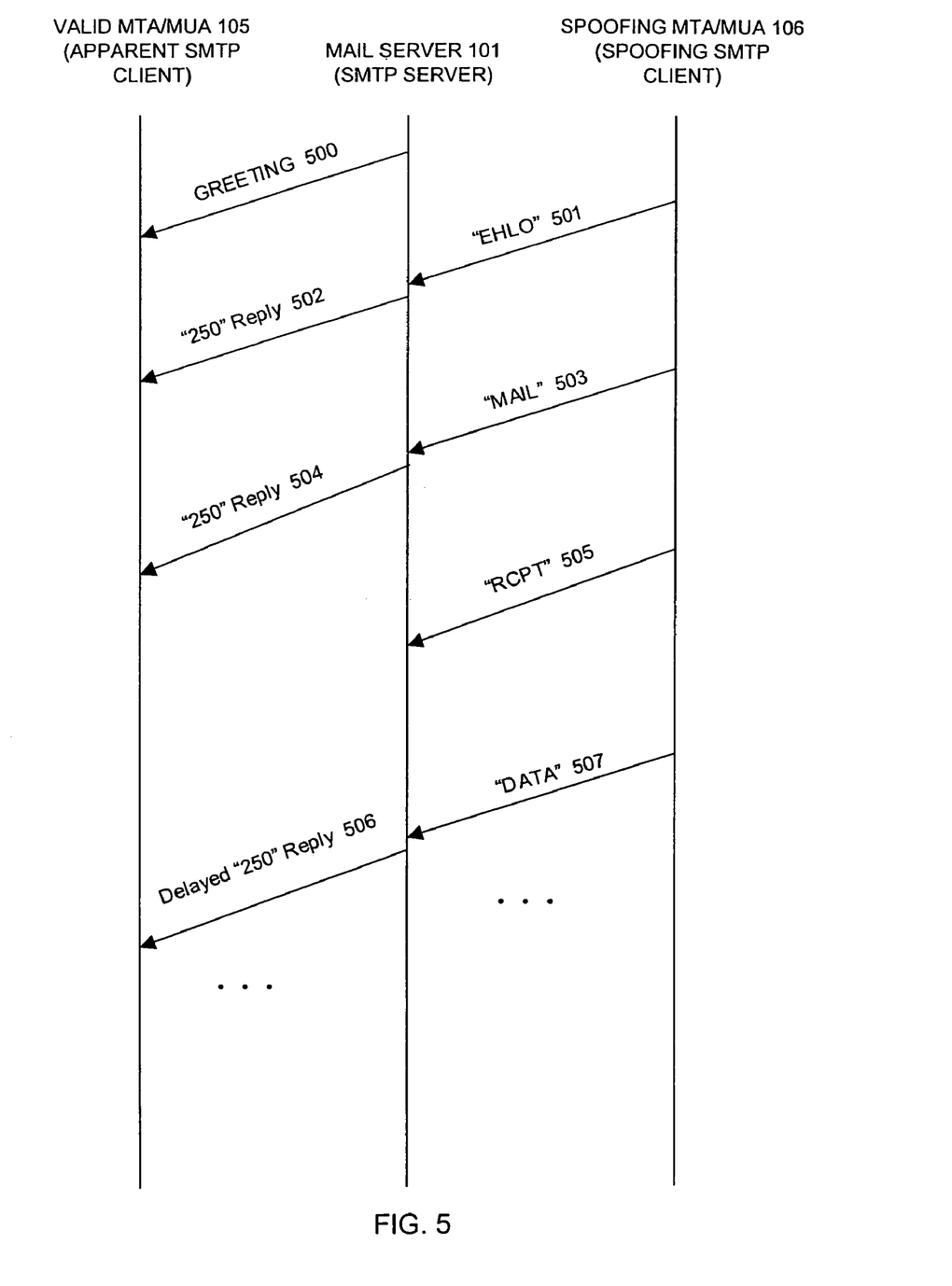
FIG. 5 is a bounce diagram illustrating the messages exchanged during a spoofed mail transaction according to an alternative embodiment of the invention.

FIG. 5 illustrates an alternative embodiment of the invention wherein mail server 101 timely sends the initial greeting command and some reply messages. For example mail server 101 sends Greeting 500 without a delay when the TCP connection is established. Mail server then sends reply 502 upon receiving EHLO command 501 without a delay and timely sends reply 504 upon receiving MAIL command 503 without a delay. However, mail server 101 does introduce a delay before sending reply 506 in response to RCPT command 505. Instead of sending reply 506 immediately upon receiving RCPT command 505, mail server 101 waits until the expiration of some delay period before transmitting reply 506. As a result, if mail server 101 receives DATA command 507 before reply 506 has been sent, then mail server 101 may assume that the sender (spoofing MTA/MUA 106) cannot receive the reply messages. Mail server 101 may identify the session as being initiated by a spammer and may treat the email data as a spam message.

The SMTP server may delay sending the reply to a particular, preselected command for each message, such as delaying the reply to the EHLO or RCPT command for each session. Alternatively, the SMTP server may randomly select a different command for each session and then may delay sending the required reply to that selected command. The SMTP server may also vary the delay period that is used. The delay period may be the same for all sessions or a different delay may be used for each session. Alternatively, a different delay may be used for different commands within the same session. For example, the SMTP server may delay the reply to the EHLO command by 5 seconds, may immediately send the reply to the MAIL command, and may then delay the reply to the DATA command by 3 seconds. Such a varied response would force the spoofing server to assume a worst-case delay for each command in order to avoid detection. It will be understood that the SMTP server may use any combination of delay times and replies in order to identify spam messages and to disrupt the spammer's ability to spoof the sender's address.

Figure 6:
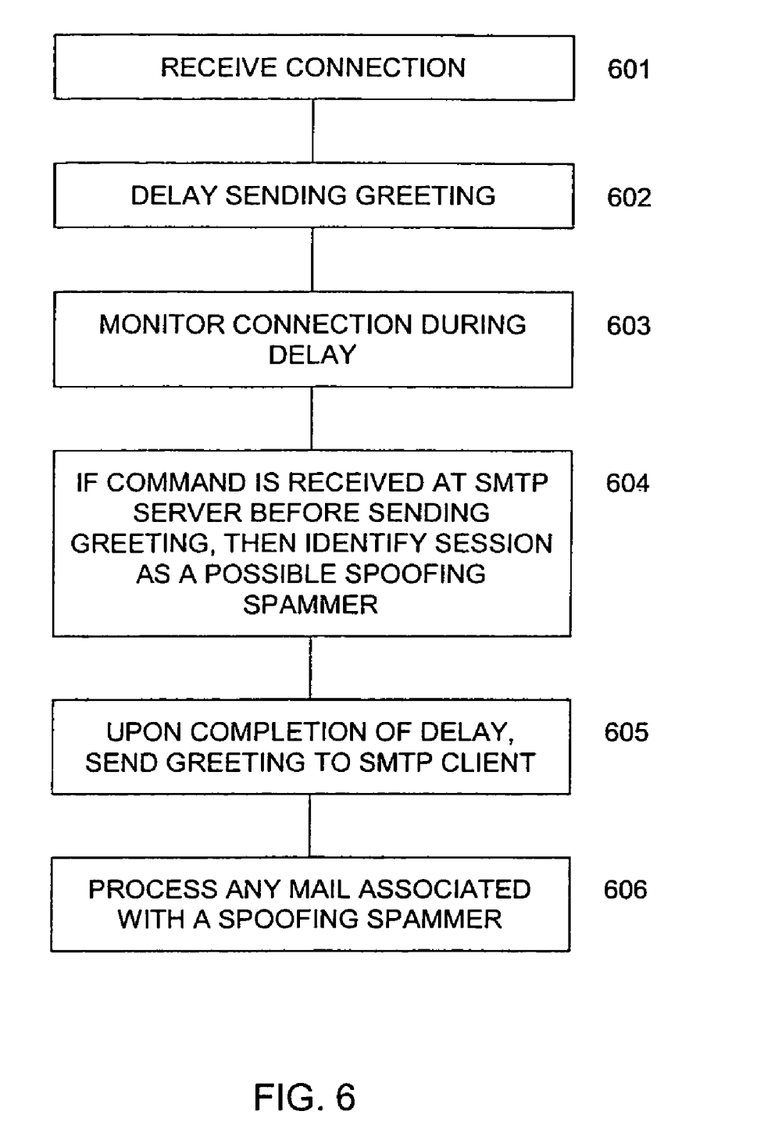
FIG. 6 is a flowchart illustrating a process for employing an embodiment of the present invention.

FIG. 6 is a flowchart illustrating a process for employing an embodiment of the present invention. The process illustrated in FIG. 6 takes advantage of the requirement that the greeting must be received by the SMTP client before any other commands are sent. At 601, a SMTP server receives a TCP connection from a MTA/MUA. Typically, the SMTP server would respond almost immediately with the greeting command. However, at 602, according to the present invention, the SMTP server delays sending the greeting. During the delay period, at 603, the SMTP server monitors the TCP connection. At 604, If any command is received by the SMTP server before it sends the greeting, the connection may be identified as possible spoofing spammer. In one embodiment of the invention, the SMTP server maintains the connection and continues to receive subsequent messages over a spoofed connection. At 605, upon completion of the delay period, the SMTP server sends the required greeting. The SMTP server may continue to send the appropriate reply to any additional SMTP commands that are received. At 606, any received mail messages that are associated with a spoofing spammer can be processed accordingly by the SMTP server. For example, the spoofed message may be deleted, may be placed in a spam folder, or may be otherwise marked as spam by the mail server.

Figure 7:
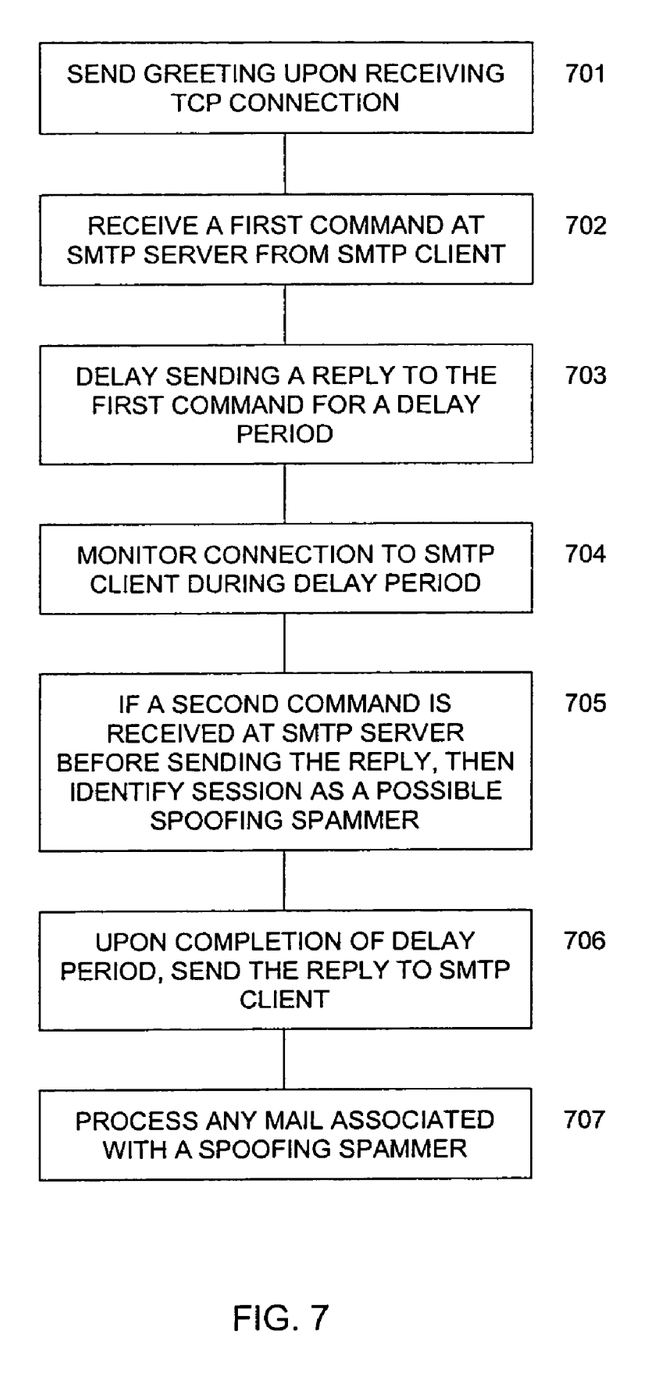
FIG. 7 is a flowchart illustrating a process for employing an alternative embodiment of the present invention.

FIG. 7 is a flowchart illustrating a process for employing an alternative embodiment of the present invention. In the process illustrated in FIG. 7, a SMTP server introduces a delay in the message flow at some point other than the initial greeting. At 701, the SMTP server receives the TCP connection and sends the required greeting. The connection proceeds as normal until, at 702, the mail server receives a first command, such as an EHLO, MAIL, RCPT, DATA or any other SMTP command, from the client. For purposes of this illustration, a command is designated by the SMTP server or by a user as a "first command" in order to distinguish it from a later command, which is designated as a "second command." It will be understood that the first command and second command may be any pair of SMTP commands, such as EHLO/MAIL, MAIL/RCPT, or the like.

At 603, the SMTP server delays sending a reply to the first command for a delay period. The delay period may be any period of time including a preset period of time or a randomly selected period of time. At 604, the SMTP server monitors the connection to the SMTP client during the delay period. At 605, if a second command is received at the SMTP server before the reply is sent to the first command, then the session may be identified as possibly coming from a spoofing spammer. At 606, upon completion of the delay period, the SMTP server sends reply message for the first command to the SMTP client. At 607, the SMTP server may process any mail messages that are associated with a spoofing spammer. For example, the spoofed message may be deleted, may be placed in a spam folder, or may be otherwise marked as spam by the mail server.

It will be understood that the present invention is not limited to mail systems that use SMTP or that comply with RFC 2821. The present invention may be used to detect spoofed emails that are sent using any protocol that requires a challenge and reply format. After detecting a command, the mail server may delay any reply that is required for a period of time, such as 3-5 seconds, and monitor whether additional commands are received during the delay period. The receipt of a second command before sending the required reply message indicates that a spoofing server may have sent the message.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for detecting a spoofed network connection comprising:
    receiving a connection from a client;
    delaying sending a greeting message for a delay period, the delay period being less than or equal to a maximum tolerable delay, the maximum tolerable delay being the longest delay that would be tolerated by a valid client;
    monitoring the connection during the delay period;
    if a command is received from the client before the greeting is sent, then identifying the connection as the spoofed connection;
    processing any electronic mail associated with the spoofed connection;
    wherein a spoofed connection electronic-mail message is processed using a process selected from the group consisting of:
        deleting the spoofed-connection electronic-mail message;
        marking the spoofed-connection electronic-mail message; and
        storing the spoofed-connection electronic-mail message in an electronic directory.

2. The method of claim 1 further comprising:
    sending the greeting to the client upon completion of the delay period.

3. The method of claim 1 wherein the connection is a Transmission Control Protocol (TCP) connection.

4. The method of claim 1 wherein the client is a Mail Transfer Agent (MTA) or Mail User Agent (MUA).

5. The method of claim 1 wherein the received command is a Simple Mail Transfer Protocol (SMTP) command.

6. A method for detecting a spoofed network connection comprising:
    receiving a first command at a server from a client;
    delaying, for a delay period, a transmission of a reply associated with the first command, the delay period being less than or equal to a maximum tolerable delay, the maximum tolerable delay being the longest delay that would be tolerated by a valid client;
    monitoring a connection between the server and the client during the delay period;
    if a second command is received at the server before the reply is transmitted, then identifying the connection as the spoofed connection;
    processing any electronic mail associated with the spoofed connection;
    wherein a spoofed connection electronic-mail message is processed using a process selected from the group consisting of:
        deleting the spoofed-connection electronic-mail message;
        marking the spoofed-connection electronic-mail message; and
        storing the spoofed-connection electronic-mail message in an electronic directory.

7. The method of claim 6 further comprising:
    sending a greeting to the client when the connection is established with the server.

8. The method of claim 6 further comprising:
    transmitting the reply upon completion of the delay period.

9. The method of claim 6 wherein the connection is a Transmission Control Protocol (TCP) connection.

10. The method of claim 6 wherein the client is a Mail Transfer Agent (MTA) or Mail User Agent (MUA).

11. The method of claim 6 wherein the received command is a Simple Mail Transfer Protocol (SMTP) command.

12. An apparatus for detecting a spoofed connection comprising:
    means for detecting when a connection is established between the apparatus and a client device;
    means for transmitting a greeting message or a reply or both to the client device;
    means for delaying the transmitting means so that the greeting message or the reply or both are not transmitted during a delay period, the delay period being less than or equal to a maximum tolerable delay, the maximum tolerable delay being the longest delay that would be tolerated by a valid client; and
    means for monitoring the connection to detect commands that are sent by the client device at least during the delay period;
    if a command is received from the client before the greeting message or a reply or both is sent then identifying the connection as the spoofed connection;
    means for processing any electronic mail associated with the spoofed connection;
    wherein a spoofed connection electronic-mail message is processed using a process selected from the group consisting of:
        deleting the spoofed-connection electronic-mail message;
        marking the spoofed-connection electronic-mail message; and
        storing the spoofed-connection electronic-mail message in an electronic directory.

13. The apparatus of claim 12 wherein the client device is a Mail Transfer Agent (MTA) or Mail User Agent (MUA).

14. The apparatus of claim 12 wherein the detecting means, the transmitting means, the delaying means, and the monitoring means comprise one or more processor-based devices running software algorithms to provide the detecting, transmitting, delaying and monitoring functions.

15. The apparatus of claim 12 wherein the connection is a Transmission Control Protocol (TCP) connection.

16. The apparatus of claim 12 wherein the commands are Simple Mail Transfer Protocol (SMTP) commands.

* * * * *